Figure 1:
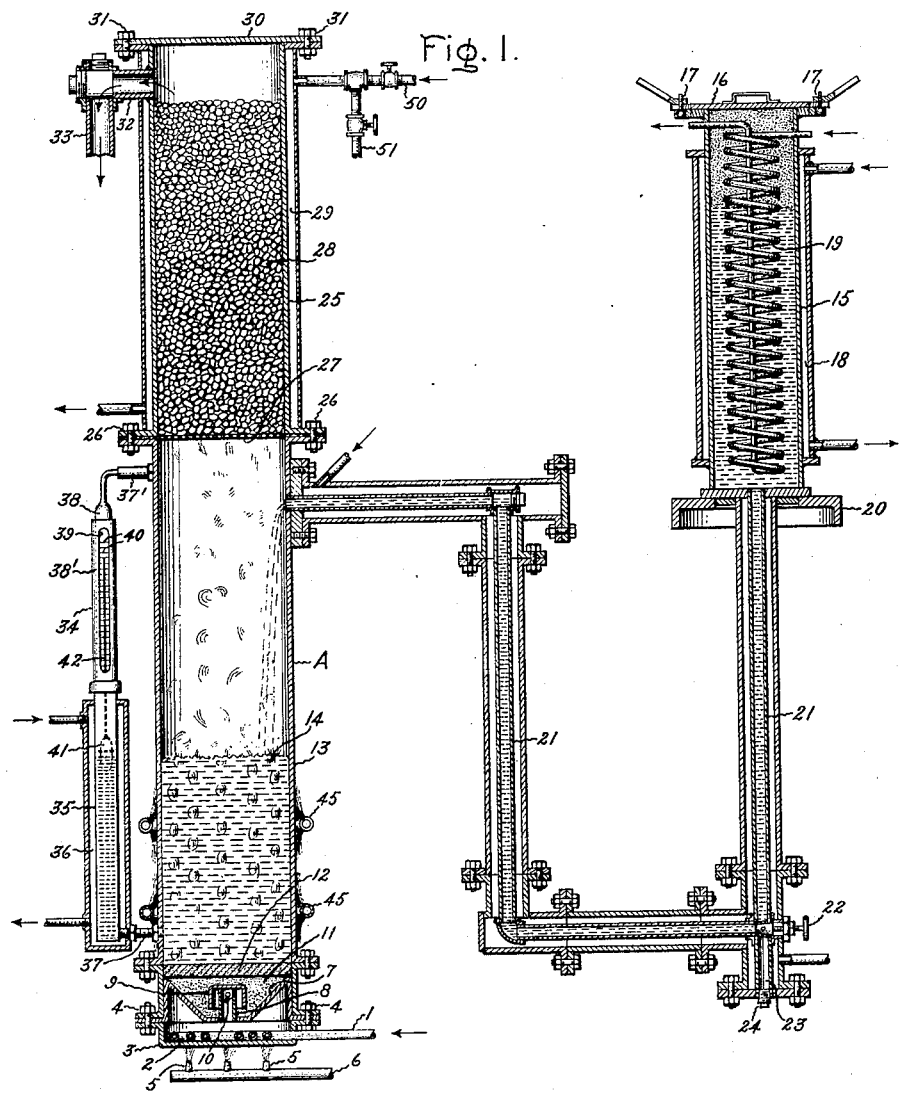

April 18, 1933.  B. W. NORDLANDER  1,904,512

METHOD AND APPARATUS FOR PREPARING SULPHUR DIOXIDE

Filed June 22, 1929

Inventor:
Birger W. Nordlander,
by Charles E. Tullar
His Attorney.

Patented Apr. 18, 1933

1,904,512

UNITED STATES PATENT OFFICE

BIRGER W. NORDLANDER, OF SCHENECTADY, NEW YORK, ASSIGNOR TO GENERAL ELECTRIC COMPANY, A CORPORATION OF NEW YORK

METHOD AND APPARATUS FOR PREPARING SULPHUR DIOXIDE

Application filed June 22, 1929. Serial No. 372,868.

This invention relates to a new and improved method and apparatus for preparing sulphur dioxide substantially free from sulphur trioxide.

When sulphur is burned in the ordinary way it combines with the oxygen present to form not only sulphur dioxide but also sulphur trioxide. When thus burned in pure dry oxygen, three per cent or more $SO_3$ is formed even in the most efficient sulphur burners. In air, as much as 10% $SO_3$ is formed. When oxygen is passed over liquid sulphur two reactions take place, one surface reaction and one vapor phase relation. The latter, however, up to 300 to 400° C., as at present known, is entirely negligible in comparison with the first. The total reaction is therefore essentially a surface reaction.

Heretofore it has not been possible to conduct the combustion of sulphur at a relatively high temperature without the formation of a considerable quantity of $SO_3$. Sulphur trioxide is, in many cases, objectionable in sulphur dioxide gas. For example, as is well known, sulphur trioxide in the presence of moisture is converted to sulphuric acid which attacks metals very readily. In certain systems of refrigeration which employ sulphur dioxide as the refrigerant, it is absolutely necessary to have sulphur dioxide gas, which is dry and substantially free from sulphur trioxide. Also in the paper industry, for example, generally sulphur dioxide is used to form calcium bisulphite for use in digestors, and any appreciable amount of sulphur trioxide in the $SO_2$ gas is highly objectionable since it reacts with the calcium oxide to form calcium sulphate, which is insoluble and clogs up the apparatus.

In accordance with my invention I provide apparatus and method whereby I can produce dry sulphur dioxide from sulphur and oxygen, which gas will have a sulphur trioxide content in the neighborhood of one-thousandth of one per cent.

My invention consists broadly in burning sulphur and oxygen in such a manner that no appreciable amount of sulphur trioxide can be formed. In order to do this the reaction between the sulphur and oxygen is carried out in an excess of sulphur, and not, as has been done in the past, in an excess of oxygen or air sweeping over molten sulphur. The reaction is caused to take place inside the molten sulphur which envelops the oxygen during reaction. Since, as pointed out above, the reaction is essentially a surface reaction, it is necessary to provide a large surface between the oxygen and sulphur in order to effectively utilize the burner. This means that the oxygen must be discharged into the sulphur in the form of minute bubbles. The smaller these can be made the larger the total surface will be. By allowing the reaction to take place in the liquid phase a more complete oxidation is insured, and under proper conditions, a burner gas free from oxygen can be obtained. Since the reaction takes place with a measurable speed, the time of contact of the oxygen with the sulphur is the determining factor in this respect; that is, for a given bubble size there is a definite maximum volume of oxygen which, at a certain height of the liquid sulphur, can be passed therethrough and still give an oxygen free burner gas. Above this rate free oxygen will begin to appear in the gas. It is important to discharge the oxygen into the liquid sulphur in the form of fine bubbles.

Figure 2:
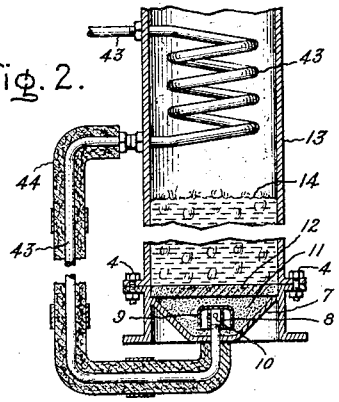

In the accompanying drawing forming a part of this application, Fig. 1 illustrates an elevational sectional view of a preferred form of apparatus for preparing the sulphur dioxide in accordance with my invention, and Fig. 2 is a fragmentary sectional view of a modified arrangement of a portion of the apparatus, for preheating the oxygen gas before it comes in contact with the sulphur.

In carrying out my invention I employ as the primary elements of the reaction sulphur and oxygen. The oxygen used is preferably practically pure, dry oxygen which may be prepared, purified and dried in any well known manner. Air or moist oxygen may also be used. The oxygen or air under suitable pressure is shown entering the apparatus through pipe 1 as it comes from the source of supply. The apparatus in which the sulphur dioxide is produced will be called the "burner" for convenience and is designated in the drawing generally at A. The pipe 1 leads in at the bottom of the burner and is coiled as at 2 so as to present a large surface area to be heated. The oxygen or air is preferably preheated before coming in contact with the sulphur. This preheating is not entirely indispensible but is preferable because a better and more complete reaction is obtained when the gas is preheated. The coil of pipe 1 rests on the bottom of a cupped flange portion 3, which is fixed as by bolt and nut members 4 to an adjacent portion of the burner. In order to heat the oxygen in the coil 2, suitable heating means such as gas jets 5, leading from the main gas pipe 6, are positioned underneath the flanged portion 3. Fixed to the flanged portion 3 is the cup-shaped member 7 and associated therewith, is an upright, tubular portion 8 provided with a covering 9 and apertures 10 to permit the gas which leaves the coil 2 to escape into the interior of the cup-shaped member 7 through which it travels upwardly through a packing of some inert substance such as sand 11. Thus member 7 may be used without any packing, if desired. Adjacent to and resting on the cup-shaped member 7 is a porous plate 12 formed of some such resistant material as alundum, through which the oxygen may discharge into the reaction chamber 13. Due to the porous condition of this plate the gas when forced therethrough is discharged in the form of minute bubbles. The liquid sulphur is prevented from seeping through the plate 12 by the air or oxygen under pressure which is forced through it. The possibility of clogging up this plate is very slight since any sulphur starting to penetrate the plate meets the hot air or oxygen and immediately burns away. The chamber 13 contains the liquid sulphur 14, which is delivered thereto from the container 15.

The container 15 is in the form of a metal tube which is provided with a removable cover 16 suitably removably secured thereto as by securing members 17. The container 15 is surrounded by a steam jacket 18, and is also provided with a steam coil 19 therein. The steam jacket and coil are supplied with steam at a suitable temperature and pressure sufficient to melt and keep in the liquid state the sulphur which is placed in the container. If desired, a continuous feed of sulphur for the container 15 may be obtained by providing the container with a suitable continuous feed apparatus. The container 15 is fixed on a suitable support 20 positioned so that the liquid sulphur will flow freely by gravity to the reaction chamber 13. Connecting the bottom of the container 15 and an elevated portion of the reaction chamber 13 is a pipe line 21 which conveys the liquid sulphur to the reaction chamber. This pipe line is suitably jacketed so that steam may be kept about it in order that the sulphur may be maintained in the liquid state as it travels from the container 15 to the reaction chamber 13. A valve 22 is interposed in the pipe line 21 in order that the flow of sulphur may be regulated and also to allow any dirt or foreign solid matter to accumulate in the trap 23 from which it may be withdrawn from time to time by removing the screw plug 24.

The reaction chamber 13 is formed of a suitable metal, such as calorized steel or cast iron lined with some suitable refractory material. At the top of this chamber is another chamber 25 also formed of a suitable metal and fixed to the reaction chamber as by bolts 26. Between these two chambers and fixed by the same bolts 26, is a perforated plate 27, which may be made of any suitable material. The chamber 25 is practically filled with small pebbles or stones 28. This chamber acts as a condenser for any of the sulphur vapor which travels up with the sulphur dioxide gas. A jacket 29 surrounds the chamber 25 and it is covered by a lid 30, fastened thereto as by bolts 31. The jacket 29 is supplied with cold water which circulates therethrough, entering the jacket through valve controlled pipe 50. At certain intervals the flow of water to the jacket is stopped and steam through valve controlled pipe 51 which connects with pipe 50 is introduced into the jacket 29 in order to melt the sulphur which has condensed on the pebbles or stones 28 within the chamber 25. The sulphur is thus caused to return to the reaction chamber 13. Connecting tubes or pipes 32—33 provides an outlet for the sulphur dioxide gas.

In order to determine the level of the liquid sulphur in the reaction chamber 13 a level indicating device, generally designated at 34, is provided. It consists of a metal tube 35 which is jacketed at 36 so that steam circulated therethrough may keep the sulphur liquid. The tube 35 is suitably connected at its bottom portion to the liquid sulphur in the reaction chamber 13 by means of tube 37. To the upper part of tube 35 is suitably connected a glass tube 38. The upper portion of this glass tube is formed as a connecting member which joins the reaction chamber at 37' at a point above the level of the liquid sulphur in the chamber 13. The interior of the indicator 34 is thus at the same pressure as the interior of the reaction chamber. The glass tube 38 is not jacketed but is shielded by means of a tubular shield 38' which is provided with a longitudinal slot 39 so as to expose a portion of the glass tube to view. Graduations 40 are placed on the portion of the tube 38 opposite the slot 39. A float 41, preferably constructed of some such material as aluminum, is within the tube 35 and floats on the surface of the liquid sulphur within this tube. This float is provided with a stem portion 42 which reaches up into the glass tube 38, and in conjunction with graduations 40 on the tube 38 acts to indicate the level of the liquid in the reaction chamber.

In Figure 2 I have indicated a modified construction of a portion of the apparatus in Figure 1, and show, in particular, means for utilizing the heat of reaction of the sulphur and oxygen in the reaction chamber 13 in order to preheat the oxygen or air used. In the arrangement shown, the oxygen or air from the sources of supply comes through the pipe 43, which enters the reaction chamber at a height above the level of the liquid sulphur therein. Within the chamber 13 the pipe 43 is coiled so as to present a large surface for heating the oxygen or air as it passes therethrough. The portion of the pipe 43 outside of the reaction chamber 13, which runs from the bottom of the coiled portion to the cup-shaped member 7, and has within it the preheated gas, is suitably insulated as at 44, to minimize any heat loss. The remaining construction is as in Fig. 1, and therefore need not be explained again in detail.

The operation of my apparatus is as follows: The sulphur which is either placed from time to time in, or continuously fed to, the container 15 is liquefied and kept liquid by the steam in the jacket 18. The liquid sulphur flows by gravity through the pipe 21, the flow being regulated by the valve 22, and enters the top portion of the reaction chamber 13. Heaters 45 on the lower outside portion of the chamber 13 keep the sulphur heated to a temperature sufficiently high so that when the air or oxygen is discharged therein reaction takes place, forming sulphur dioxide. Heaters 45 are not necessary throughout the entire run of the burner. After the reaction gets under way the heat reaction of the sulphur and oxygen is sufficient to keep the reaction going. The oxygen or air is forced through the porous plate 12 at a predetermined rate and travels through the boiling sulphur in the form of numerous small bubbles which rapidly react with the sulphur to form sulphur dioxide. There is no volume change taking place during this reaction, since the gram-molecular volume of sulphur dioxide is the same as that of oxygen. The main part of the sulphur vapor that goes over with the burner gas settles out in the vertical condenser 25. The burner gas coming from the condenser passes out through pipes 32—33 and may be further purified if desired in order to remove the traces of sulphur and sulphur trioxide that may still be in the gas, in accordance with my purifying apparatus and method set forth in my copending application, Serial No. 375,226 filed July 1, 1929 now Patent Number 1,823,698 granted Sept. 15, 1931.

The apparatus herein described is claimed in my copending application Serial No. 522,477, filed March 13, 1931, which application is a division of the present application.

What I claim as new and desire to secure by Letters Patent of the United States is:—

1. The process of preparing sulphur dioxide substantially free from sulphur trioxide, which comprises reacting oxygen gas within an excess of liquid sulphur in an enclosed space by passing said gas through the liquid sulphur at a rate such that substantially no free oxygen emerges therefrom.

2. The process of preparing sulphur dioxide substantially free from sulphur trioxide, which comprises passing oxygen gas in the form of minute bubbles through a body of liquid sulphur and at a rate such that substantially no free oxygen emerges therefrom at a temperature sufficiently high to cause interaction between the sulphur and oxygen to form sulphur dioxide the liquid sulphur being kept always in excess.

3. The process of preparing sulphur dioxide substantially free from sulphur trioxide which consists in confining a body of liquid sulphur within an enclosed space, discharging oxygen in the form of fine bubbles and under pressure into said body of liquid sulphur at a predetermined rate such that substantially no free oxygen emerges therefrom, and condensing out substantially all the sulphur vapor which travels with the sulphur dioxide gas.

In witness whereof, I have hereunto set my hand this 21st day of June, 1929.

BIRGER W. NORDLANDER.

CERTIFICATE OF CORRECTION.

Patent No. 1,904,512. April 18, 1933.

BIRGER W. NORDLANDER.

It is hereby certified that error appears in the printed specification of the above numbered patent requiring correction as follows: Page 3, line 80, claim 2, strike out the word "and" and insert the same after "therefrom" in line 81; and that the said Letters Patent should be read with this correction therein that the same may conform to the record of the case in the Patent Office.

Signed and sealed this 23rd day of May, A. D. 1933.

M. J. Moore.
(Seal) Acting Commissioner of Patents.